(12) United States Patent
Cavarec et al.

(10) Patent No.: US 11,279,200 B2
(45) Date of Patent: Mar. 22, 2022

(54) MOTOR VEHICLE WHEELSET ANTI-ROLL DEVICE WITH ACTUATING MEANS OPERATED BY A HYDRAULIC CONTROL CIRCUIT

(71) Applicants: PSA AUTOMOBILES SA, Poissy (FR); BWI FRANCE S.A.S.U., Roissy-en-France (FR)

(72) Inventors: Alan Cavarec, Les Loges en Josas (FR); Philippe Germain, Fontenay-sous-Bois (FR); Bruno Perrée, Paris (FR)

(73) Assignees: PSA AUTOMOBILES SA, Poissy (FR); BWI FRANCE S.A.S.U., Roissy-en-France (FR)

( * ) Notice: Subject to any disclaimer, the term of this patent is extended or adjusted under 35 U.S.C. 154(b) by 105 days.

(21) Appl. No.: 16/644,131

(22) PCT Filed: Aug. 27, 2018

(86) PCT No.: PCT/FR2018/052106
§ 371 (c)(1),
(2) Date: Mar. 3, 2020

(87) PCT Pub. No.: WO2019/053351
PCT Pub. Date: Mar. 21, 2019

(65) Prior Publication Data
US 2020/0269649 A1    Aug. 27, 2020

(30) Foreign Application Priority Data
Sep. 12, 2017   (FR) ...................................... 1758458

(51) Int. Cl.
*B60G 21/055*    (2006.01)

(52) U.S. Cl.
CPC .... *B60G 21/0556* (2013.01); *B60G 2202/135* (2013.01); *B60G 2202/413* (2013.01); *B60G 2202/414* (2013.01)

(58) Field of Classification Search
CPC .......... B60G 21/0556; B60G 2202/413; B60G 2202/414; B60G 2202/441
See application file for complete search history.

(56) References Cited

U.S. PATENT DOCUMENTS 4,805,929 A * 2/1989 Shibata .............. B60G 21/0556
280/5.511
5,230,529 A * 7/1993 Harvey-Bailey .. B60G 17/0162
280/5.508
(Continued)

FOREIGN PATENT DOCUMENTS

FR    2786133 A1    5/2000
JP    S6340214 U    3/1988
(Continued)

OTHER PUBLICATIONS

International Search Report for PCT/FR2018/052106 dated Dec. 11, 2018.
Written Opinion for PCT/FR2018/052106 dated Dec. 11, 2018.

*Primary Examiner* — Frank B Vanaman
(74) *Attorney, Agent, or Firm* — Sandberg Phoenix & von Gontard, P.C.

(57) ABSTRACT

An anti-roll device comprises a bar coupled to two links, a hydraulic control circuit (CC) and actuating means (MAC) comprising a casing (CR) defining the chamber (CH) subdivided into a first (P1) and a second (P2) part by a piston (PI), and comprising first (ES1) and second (ES2) inlets-outlets communicating with the first (P1) and second (P2) parts and an intermediate inlet-outlet (ES1) communicating with the first part (P1) or with the second part (P2) depending on the position of the piston (PI). These actuating means
(Continued)

(MAC) adopt a disengaged state or block state in whatever position of the piston (PI), according to the accessibility status of the first (ES1) and second (ES2) inlets-outlets and of the intermediate inlet-outlet (ES1). The control circuit (CC) controls the accessibility statuses according to the commands received.

12 Claims, 7 Drawing Sheets

(56) References Cited

U.S. PATENT DOCUMENTS

| | | | | |
|---|---|---|---|---|
| 5,630,623 | A * | 5/1997 | Ganzel | B60G 21/055 |
| | | | | 280/124.106 |
| 5,788,031 | A | 8/1998 | Saito | |
| 6,179,310 | B1 * | 1/2001 | Clare | B60G 17/0152 |
| | | | | 280/124.106 |
| 6,520,510 | B1 * | 2/2003 | Germain | B60G 17/0152 |
| | | | | 280/124.106 |
| 7,162,945 | B2 * | 1/2007 | Tatsuya | B60G 17/0162 |
| | | | | 91/441 |
| 8,167,319 | B2 | 5/2012 | Ogawa | |
| 2006/0290079 | A1 | 12/2006 | Smay | |
| 2007/0108707 | A1 * | 5/2007 | Kobayashi | B60G 21/0556 |
| | | | | 280/5.511 |

FOREIGN PATENT DOCUMENTS

| | | |
|---|---|---|
| JP | S6364813 A | 3/1988 |
| JP | H0234302 U | 3/1990 |
| JP | H0263914 A | 3/1990 |

* cited by examiner

MOTOR VEHICLE WHEELSET ANTI-ROLL DEVICE WITH ACTUATING MEANS OPERATED BY A HYDRAULIC CONTROL CIRCUIT

CROSS-REFERENCE TO RELATED APPLICATIONS

This application is the US National Stage under 35 USC § 371 of International Application No. PCT/FR2018/052106, filed 27 Aug. 2018 which claims priority to French Application No. 1758458 filed 12 Sep. 2017, both of which are incorporated herein by reference.

BACKGROUND

The invention relates to the anti-roll (or stabilization) devices with which some motor vehicles are equipped.

As is known to a person skilled in the art, an anti-roll (or stabilization) device is a piece of equipment comprising a bar the opposing ends of which are respectively coupled to right and left wheels of a (motor) vehicle wheelset via two links.

A device of this type is mainly acted on when the vehicle is rolling on a turn or on a traffic lane that is eroded asymmetrically about the longitudinal axis thereof. During a turn, the bar is placed under torsion and bending so as to maintain the attitude of the vehicle insofar as possible, and so the more rigid it is the more useful it is. In the presence of erosion, the bar partially transmits the irregularity of the traffic lane experienced by one of the wheels of a wheelset to the other wheel of this same wheelset, by a mechanism known as roll transfer, and thus the more rigid it is the greater a decrease in comfort it causes.

As is described in U.S. Pat. No. 8,167,319, the decrease in comfort caused by the anti-roll device can be varied as a function of the scenarios encountered, by joining to each link a hydraulic actuator, which is coupled to a fluid circuit comprising a solenoid valve, check valves and a fluid reservoir for compensating the variations in volume caused by the movements of the piston of the hydraulic actuator. In this context, each fluid circuit is of relatively low-complexity, but the presence of two fluid circuits increases the total space requirement and the price. Thus, when the vehicle comprises two wheelsets, there end up being four solenoid valves. However, the higher the number of solenoid valves, the greater the risk of breakdown or malfunction and the higher the electrical power consumption. Moreover, the higher the number of solenoid valves, the greater the number of electrical harnesses have to be provided for supplying power and commands to these solenoid valves, and so the more the production and installation costs and the complexity of installation in the vehicle and of the algorithms for generating the commands for the solenoid valves are increased.

Moreover, the hydraulic circuit does not make it possible to ensure that the hydraulic actuator is in the neutral position (where it does not exert any force) when it is placed in a blocked state (preventing a variation in length).

SUMMARY

Therefore, the object of the invention is in particular to improve the situation.

For this purpose, an anti-roll device is proposed which is intended for equipping a motor vehicle wheelset having right and left wheels, and comprising a bar suitable for coupling to these right and left wheels via two links.

This anti-roll device is characterized in that it comprises actuating means, forming part of the bar or of one of the links and comprising a casing defining a chamber subdivided into first and second parts of variable volumes by a piston, and comprising first and second inputs/outputs communicating with the first and second parts respectively and an intermediate input/output communicating with the first part or the second part depending on the position of the piston, and adopting a disengaged state or blocked state in any given position of the piston according to the respective current accessibility statuses of the first and second inlets/outlets and of the intermediate inlet/outlet, and a hydraulic control circuit controlling the accessibility statuses according to the commands received.

As a result of the invention, it is now possible to place the actuating means in the blocked state regardless of the current position of the piston. The link or bar comprising the actuating means will always return to the neutral position under the effect of the movement of the wheels or undercarriage, and will remain in the neutral position afterwards. This makes it possible to achieve the blocked behavior without waiting for the link or bar to be positioned in the center. This also avoids implementing a control algorithm for blocking the link or bar in the neutral position, along with the associated sensors and the related risks.

The anti-roll device may have other features, which may be taken separately or in combination, and in particular:

the control circuit may comprise, firstly, first and second non-return means each coupled to at least one of the first and second inputs/outputs and intermediate input/output, secondly, at least one solenoid valve coupled to at least one of the first and second inputs/outputs and intermediate input/output and optionally to at least one of the first and second non-return means and placed either in a first state enforcing the disengaged state or in a second state enforcing the blocked state, and, thirdly, a fluid reservoir compensating at least variations in volume caused by displacements of the piston;

in a first embodiment, the control circuit may, firstly, couple the first input/output to the fluid reservoir via the first non-return means, only allowing passage of fluid from the fluid reservoir to the first input/output, and via a first solenoid valve mounted in parallel with the first non-return means and capable of adopting either a first, open state associated with the disengaged state or a second, closed state associated with the blocked state, secondly, couple the second input/output to the fluid reservoir via the second non-return means, only allowing passage of fluid from the fluid reservoir to the second input/output, and via a second solenoid valve mounted in parallel with the second non-return means and capable of adopting either a first, open state associated with the disengaged state or a second, closed state associated with the blocked state, and, thirdly, couple the intermediate input/output to the fluid reservoir. In this case, the control circuit places the first and second solenoid valves either in the first, open state so as to place the actuating means in the disengaged state or in the second, closed state so as to place the actuating means in the blocked state;

in a second embodiment, the control circuit may, firstly, couple the first input/output to the fluid reservoir via a first solenoid valve comprising the first non-return means, only allowing passage of fluid from the fluid reservoir to the first input/output and capable of adopting either a first, open state associated with the disengaged state or a second state defined by the first non-return means and associated with the blocked state, secondly, couple the second input/output to the fluid reservoir via a second solenoid valve comprising the second non-return means, only allowing passage of fluid from the fluid reservoir to the second input/output and capable of adopting either a first, open state associated with the disengaged state or a second state defined by the second non-return means and associated with the blocked state, and, thirdly, couple the intermediate input/output to the fluid reservoir. In this case, the control circuit places the first and second solenoid valves either in the first, open state so as to place the actuating means in the disengaged state or in the second state so as to place the actuating means in the blocked state;

in a third embodiment, the control circuit may, on the one hand, couple the first and second inputs/outputs to the fluid reservoir via an at least three-way solenoid valve comprising the first and second non-return means, only allowing passage of fluid from the fluid reservoir to the first and second inputs/outputs respectively and capable of adopting either a first, open state associated with the disengaged state or a second state defined by the first and second non-return means and associated with the blocked state, and, on the other hand, couple the intermediate input/output to the fluid reservoir. In this case, the control circuit places the first and second solenoid valves either in the first, open state so as to place the actuating means in the disengaged state or in the second state so as to place the actuating means in the blocked state;

in a fourth embodiment, the control circuit may couple the first and second inputs/outputs and the intermediate input/output to the fluid reservoir via a six-way solenoid valve, on the one hand comprising the first and second non-return means which only passage of fluid from the fluid reservoir to the first and second inputs/outputs respectively, and on the other hand is capable of adopting either a first, open state, which is associated with the disengaged state and in which the fluid flows between the first and second parts and the fluid reservoir but does not flow between the intermediate input/output and the fluid reservoir, or a second state, which is associated with the blocked state and in which the fluid flows from the fluid reservoir to the first and second parts via the first and second non-return means respectively and flows between the intermediate input/output and the fluid reservoir. In this case, the control circuit places the solenoid valve either in the first, open state so as to place the actuating means in the disengaged state or in the second state so as to place the actuating means in the blocked state;

the piston may comprise a peripheral edge having a thickness strictly greater than a corresponding dimension of the intermediate input/output. For example, the peripheral edge of the piston may partially house a gasket having a thickness strictly greater than the corresponding dimension of the intermediate input/output;

one of the links may comprise actuating means and may form a link of variable length guided by the command, and the other link may be of a fixed length;

in a variant, the bar may comprise first and second arms each comprising a first end coupled to one of the links and a second end coupled to the casing or to the piston of the actuating means;

the casing and the piston may define a cylinder actuator or a screw actuator. In the case of a screw actuator, it is preferably a ball screw actuator;

it may comprise dedicated control means for generating each command to each solenoid valve.

DESCRIPTION OF THE FIGURES

The invention further proposes a motor vehicle comprising at least one wheelset comprising right and left wheels coupled via an anti-roll device of the same type set out above.

Further features and advantages of the invention will become apparent upon examining the following detailed description and the accompanying drawings, in which.

DETAILED DESCRIPTION

The object of the invention is, in particular, to propose an anti-roll (or stabilization) device DA for equipping a wheelset of a motor vehicle.

In the following, it is assumed by way of non-limiting example that the motor vehicle is a car. However, the invention is not limited to such a motor vehicle. In fact, it relates to any type of motor vehicle comprising at least one wheelset that is to be equipped with an anti-roll device.

Moreover, it is assumed in the following, by way of non-limiting example, that the wheelset is intended for installation in a front part of a motor vehicle. However, the invention equally relates to rear motor vehicle wheelsets.

Figure 1:
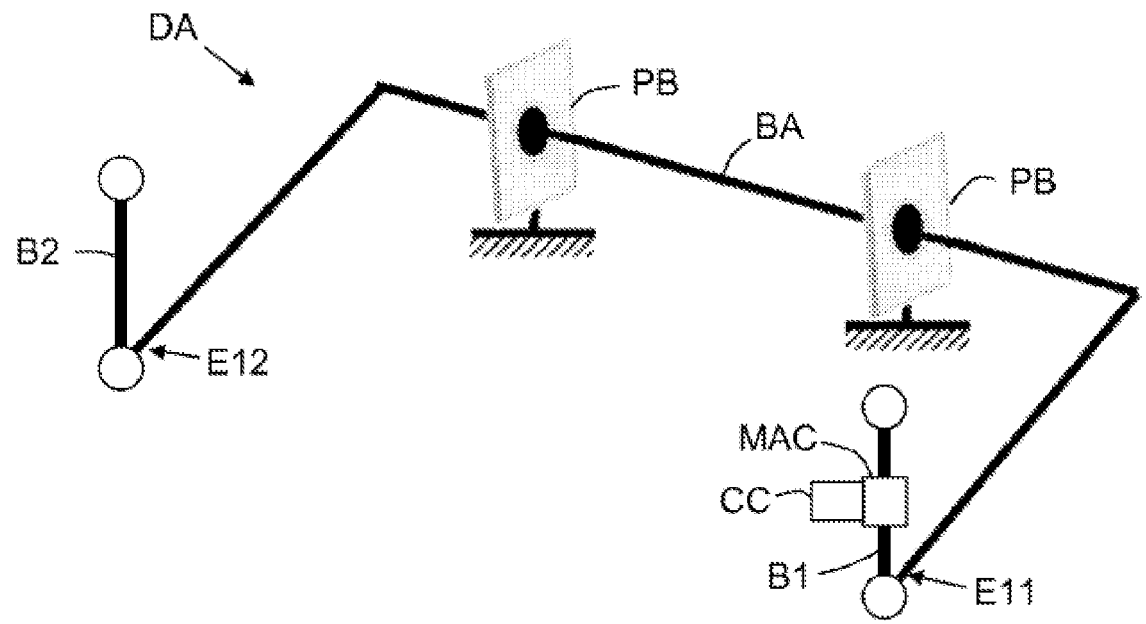
FIG. 1 schematically and functionally illustrates, in a perspective view, a first embodiment of an anti-roll device, before it is coupled to a motor vehicle wheelset, FIG. 2 schematically and functionally illustrates, in a perspective view, a second embodiment of an anti-roll device, before it is coupled to a motor vehicle wheelset, FIG. 3 schematically and functionally illustrates, in a sectional view, a first embodiment of an actuating means and a control circuit of an anti-roll device, FIG. 4 schematically and functionally illustrates, in a sectional view, a second embodiment of an actuating means and a control circuit of an anti-roll device, FIG. 5 schematically and functionally illustrates, in a sectional view, a third embodiment of an actuating means and a control circuit of an anti-roll device, FIG. 6 schematically and functionally illustrates, in a sectional view, a fourth embodiment of an actuating means and a control circuit of an anti-roll device, FIG. 7 schematically and functionally illustrates, in a sectional view, a fifth embodiment of an actuating means and a control circuit of an anti-roll device, FIG. 8 schematically and functionally illustrates the use of a ball screw actuator as an actuating means.
Figure 2:
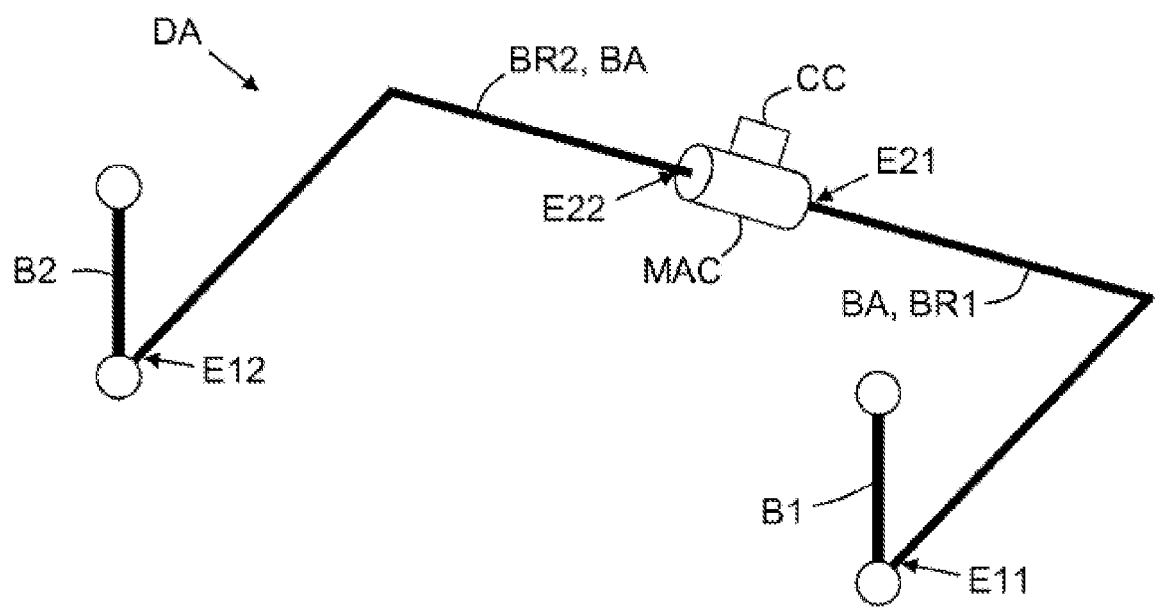

FIGS. 1 and 2 schematically illustrate two embodiments of an anti-roll device DA, intended to equip a wheelset of a motor vehicle (in this case a car). As is shown, an anti-roll device DA comprises at least one anti-roll bar BA, first B1 and second B2 links, actuating means MAC, and a hydraulic control circuit CC.

The (anti-roll) bar BA is suitable for coupling to right and left wheels of a motor vehicle wheelset, via the first B1 and second B2 links. It is moreover coupled to the undercarriage of the vehicle, for example via bearings PB, as is shown in a non-limiting manner in FIG. 1.

It will be noted that, in the two examples shown in a non-limiting manner in FIGS. 1 and 2, the (anti-roll) bar BA has an overall U shape. However, it may have other shapes.

In the first example, shown in a non-limiting manner in FIG. 1, the (anti-roll) bar BA is single-piece. It thus comprises two opposing ends E1$j$ ($j$=1 or 2) suitable for coupling to the right and left wheels respectively of a wheelset via the first B1 and second B2 links. The link B$j$ and end E1$j$ may be coupled using a ball-and-socket or pivot connection, for example.

Figure 8:
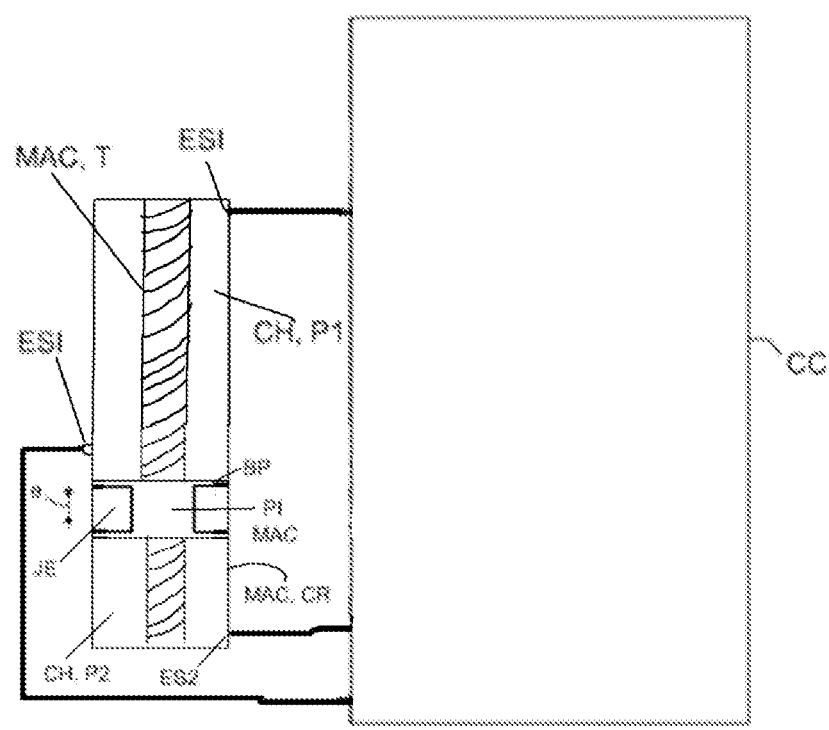

In the second example, shown in a non-limiting manner in FIG. 2, the casing CR and the piston PI may define a cylinder actuator or a screw actuator, in particular a ball screw actuator (as shown in FIG. 8), for example, since they allow variation, through a combination of a rotation and translation of the piston PI with the rod T thereof, in the relative rotation of the first arm BR1 with respect to the second arm BR2. In other words, one of the two parts P$j$ (for example P1) forms a "stator chamber" while the other part (for example P2) forms a "rotor chamber." The two links B$j$ are thus of a fixed length in this case. They (B$j$) are thus conventional in that they lack actuating means MAC.

In the two examples shown in a non-limiting manner in FIGS. 1 and 2, a value 1 of the index $j$ designates the right hand while a value 2 of the index $j$ designates the left side. However, the reverse is possible.

The actuating means MAC are either part of one of the links B$j$, as shown in FIG. 1, or part of the bar BA, as shown in FIG. 2. In both cases, these actuating means MAC comprise a casing CR and a piston PI.

The casing CR defines a chamber CH subdivided into first P1 and second P2 parts of variable volume by a piston PI rigidly fixed to a rod T. In addition, the casing CR comprises a first input/output ES1 that communicates with the first part P1 of the chamber CH, a second input/output ES2 that communicates with the second part P2 of the chamber CH, and an intermediate input/output ESI that communicates with the first part P1 or the second part P2 of the chamber CH depending on the position of the piston PI.

The casing CR and the piston PI (with the rod T thereof) define a sort of actuator having three inputs/outputs ES1, ES2 and ESI.

The piston PI comprises a peripheral edge BP having a thickness e strictly greater than a corresponding dimension of the intermediate input/output ESI, in such a way that fluid cannot enter or exit via the input/output ESI of the chamber CH when the piston PI is placed in front of this intermediate input/output ESI.

It is preferable for the peripheral edge BP of the piston PI partially to house a gasket JE having a thickness strictly greater than the corresponding dimension of the intermediate input/output ESI. This makes it possible for the gasket JE to obstruct the intermediate input/output ESI completely when the piston PI is placed in front of this intermediate input/output ESI (and therefore midway).

In the first example, shown in a non-limiting manner in FIG. 1, the casing CR is rigidly fixed to a lower part of the first link B1, and the end of the rod T opposite the piston PI is rigidly fixed to an upper part of the first link B1. By contrast, in the second example, shown in a non-limiting manner in FIG. 2, the casing CR is rigidly fixed to the second end E21 of the first arm BR1, and the end of the rod T opposite the piston PI is rigidly fixed to the second end E22 of the second arm BR2. A reverse arrangement is equally possible.

It will be noted that the casing CR may, for example, have a circular cylindrical shape.

It will also be noted that, in the first example, shown in a non-limiting manner in FIG. 1, the casing CR and the piston PI may define a conventional actuator, since they allow variation, by translating the piston PI with the rod T thereof, in the length (or height) of the first link B1 when the first link B1 reacts to the loads from the wheelset. In other words, one of the links B$j$ (in this case B1) forms a link of variable length that is guided by a command, and the other link B$j$' (in this case B2) is of a fixed length and is thus basically conventional.

In the second example, shown in a non-limiting manner in FIG. 2, the casing CR and the piston PI may define a cylinder actuator or a screw actuator, in particular a ball screw actuator, for example, since they allow variation, through a combination of a rotation and translation of the piston PI with the rod T thereof, in the relative rotation of the first arm BR1 with respect to the second arm BR2. In other words, one of the two parts P$j$ (for example P1) forms a "stator chamber" while the other part (for example P2) forms a "rotor chamber." The two links B$j$ are thus of a fixed length in this case. They (B$j$) are thus conventional in that they lack actuating means MAC.

These actuating means MAC may adopt either a disengaged position or a blocked position in any given position of the piston PI, according to the accessibility status of the first ES1 and second ES2 inputs/outlets and of the intermediate inlet/outlet ESI.

Here, "accessibility status" is understood to mean whether it is possible or impossible for a fluid to enter via an input/output so as to penetrate into a part of the chamber of the casing or exit via an input/output to flow in the control circuit CC.

The control circuit CC is hydraulic (and is thus passed through by a fluid), and controls the accessibility statuses of the inputs/outputs ES1, ES2 and ESI according to the commands received.

The fluid may, for example, be an oil. Thus, it may for example be a hydraulic oil or a shock absorber oil.

Each received command may, for example, be determined as a function of irregularities detected below the vehicle by a physical parameter sensor (such as an accelerometer) and/or of an end of a turn, detected in front of the vehicle by observation means or by a satellite navigation system, and/or of the current speed of the vehicle. Moreover, each received command originates from control means MCT, which may optionally be part of the anti-roll device DA. For example, it may be part of a computer of the vehicle and be responsible for determining each command dynamically in real time.

For example, the control circuit CC may comprise first MA1 and second MA2 non-return means, at least one solenoid valve EV$k$ ($k$=1 or 2) and a fluid reservoir RF, as is shown in a non-limiting manner in FIGS. 3 to 7.

The first MA1 and second MA2 non-return means are each coupled to at least one of the first ES1 and second ES2 inputs/outputs and the intermediate input/output ESI.

For example, these first MA1 and second MA2 non-return means may be arranged in the form of non-return valves. However, this is not required. In fact, what is important is that they each allow a flow of fluid in a single direction (in this case to at least one of the inputs/outputs ES1 and ES2)

but not in the opposite direction (in this case namely from at least one of the inputs/outputs ES1 and ES2).

The/each solenoid valve EVk is coupled to at least one of the first ES1 and second ES2 inputs/outputs and the intermediate input/output ESI, and optionally to at least one of the first MA1 and second MA2 non-return means, and may be placed either in a first state enforcing the disengaged state of the actuation means MAC or in a second state enforcing the blocked state of the actuation means MAC.

In the disengaged state, the first P1 and second P2 parts of the chamber CH may be interconnected and connected to the fluid reservoir RF by the control circuit CC, and as a result the length (or height) of the first link B1 can be varied freely. As can be appreciated, in the disengaged state, the/each solenoid valve EVk is adapted to allow fluid to bypass the first MA1 and second MA2 non-return means, such that fluid can flow from the reservoir to the first ES1 and second ES2 inputs/outputs.

In the blocked state, the/each solenoid valve EVk only allows evacuation of fluid from the chamber CH via the intermediate input/output ESI, and as a result the length (or height) of the first link B1 cannot be varied freely. This is a mode of operation similar to that of a hydraulic ratchet, making it possible to have a midway equilibrium position when the piston PI is at the intermediate input/output ESI.

The (first or second) state in which a solenoid valve EVk is placed is guided (or defined) by the command received by this solenoid valve EVk.

The fluid reservoir RF is responsible for compensating at least variations in volume caused by displacements of the piston PI, as well as potentially variations due to temperature.

The example control circuit CC described above may be arranged in different forms. Five of these forms are described in the following with reference to FIGS. 3 to 7 respectively.

Figure 3:
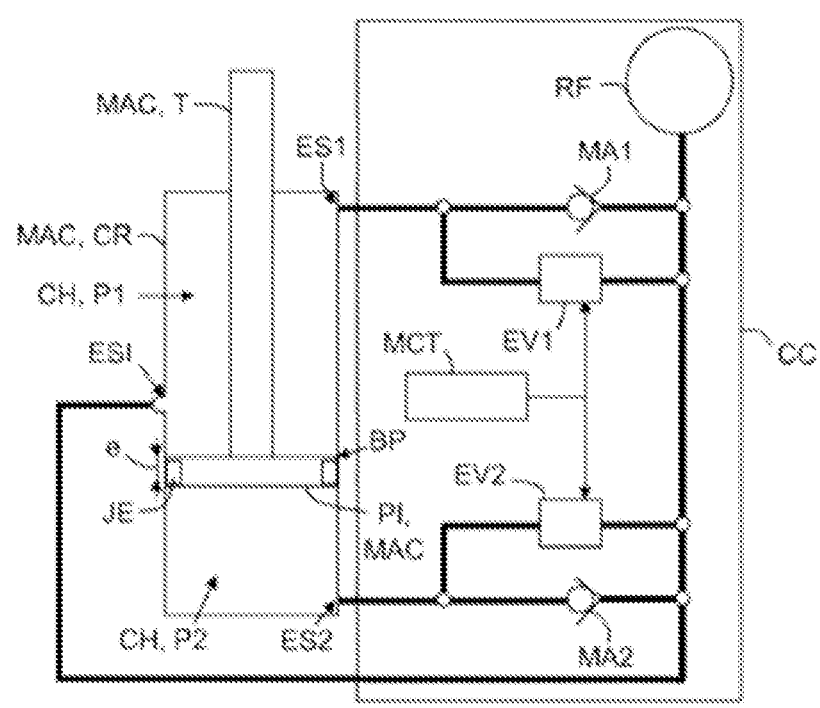

In the first form, illustrated in FIG. 3, the control circuit CC comprises first EV1 (k=1) and second EV2 (k=2) two-way solenoid valves, the first MA1 and second MA2 non-return means, the fluid reservoir RF and lines in which the fluid can flow.

This control circuit CC couples:
the first input/output ES1 to the fluid reservoir RF via the first non-return means MA1, which only allows passage of fluid from the fluid reservoir RF to the first input/output ES1, and via the first solenoid valve EV1, mounted in parallel with the first non-return means MA1 and capable of adopting either a first, open state associated with the disengaged state or a second, closed state associated with the blocked state,
the second input/output ES2 to the fluid reservoir RF via the second non-return means MA2, which only allows passage of fluid from the fluid reservoir RF to the second input/output ES2, and via the second solenoid valve EV2, mounted in parallel with the second non-return means MA2 and capable of adopting either a first, open state associated with the disengaged state or a second, closed state associated with the blocked state, and
the intermediate input/output ESI to the fluid reservoir RF.

In addition, the control circuit CC places the first EV1 and second EV2 solenoid valves either in the first, open state, when the actuating means MAC are to be placed in the disengaged state, or in the second, closed state, when the actuating means MAC are to be placed in the blocked state. As a result, in the disengaged state, the fluid flows between the first P1 and second P2 parts of the chamber CH, as well as between the first P1 and second P2 parts and the fluid reservoir RF. In the blocked state, the fluid is prevented from flowing not only between the first P1 and second P2 parts of the chamber CH, but also between the first P1 and second P2 parts and the fluid reservoir RF.

Figure 4:
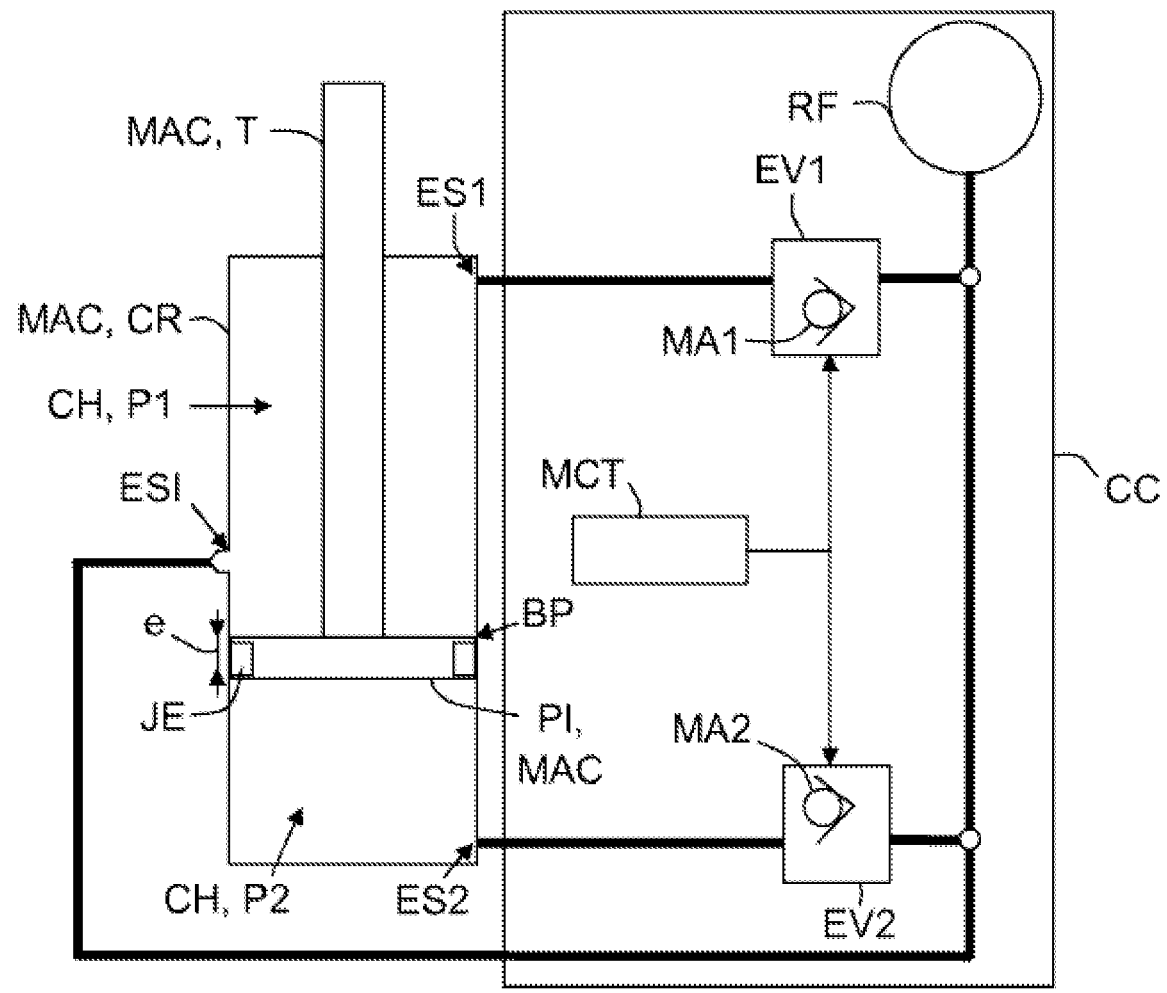

In the second form, illustrated in FIG. 4, the control circuit CC comprises first EV1 (k=1) and second EV2 (k=2) two-way solenoid valves comprising the first MA1 and second non-return means respectively, the fluid reservoir RF, and lines through which the fluid can flow.

This control circuit CC couples:
the first input/output ES1 to the fluid reservoir RF via the first solenoid valve EV1, which comprises the first non-return means MA1 that only allows passage of fluid from the fluid reservoir RF to the first input/output ES1, and which is capable of adopting either a first, open state associated with the disengaged state or a second state defined by the first non-return means MA1 and associated with the blocked state,
the second input/output ES2 to the fluid reservoir RF via the second solenoid valve EV2, which comprises the second non-return means MA2 that only allows passage of fluid from the fluid reservoir RF to the second input/output ES2, and which is capable of adopting either a first, open state associated with the disengaged state or a second state defined by the first non-return means MA2 and associated with the blocked state, and,
the intermediate input/output ESI to the fluid reservoir RF.

In addition, the control circuit CC places the first EV1 and second EV2 solenoid valves either in the first, open state, when the actuating means MAC is to be placed in the disengaged state, or in the second, closed state, when the actuating means MAC is to be placed in the blocked state. As a result, in the disengaged state, the fluid flows between the first P1 and second P2 parts of the chamber CH, as well as between the first P1 and second P2 parts and the fluid reservoir RF. In the blocked state, the fluid is prevented from flowing not only between the first P1 and second P2 parts of the chamber CH, but also between the first P1 and second P2 parts and the fluid reservoir RF.

Figure 5:
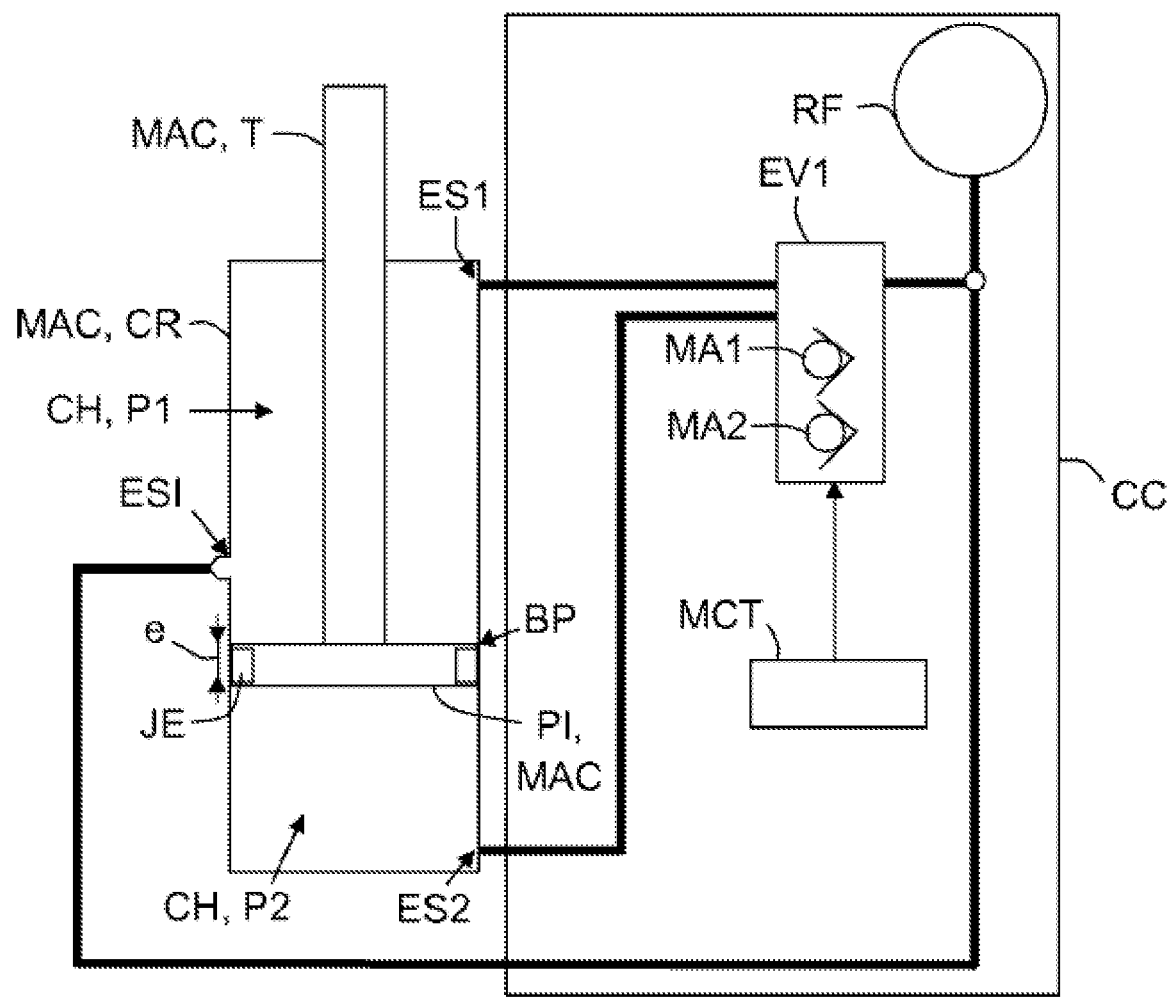

In the third form, illustrated in FIG. 5, the control circuit CC comprises a three-way solenoid valve EV1 (K=1) comprising the first MA1 and second MA2 non-return means, the fluid reservoir RF, and lines through which the fluid can flow.

This control circuit CC couples:
the first ES1 and second ES2 inputs/outputs to the fluid reservoir RF via an at least three-way solenoid valve EV1, which comprises the first MA1 and second MA2 non-return means that only allows passage of fluid from the fluid reservoir RF to the first ES1 and second ES2 inputs/outputs respectively, and which is capable of adopting either a first, open state associated with the disengaged state or a second state defined by the first MA1 and second MA2 non-return means and associated with the blocked state, and
the intermediate input/output to the fluid reservoir.

In addition, the control circuit CC places the solenoid valve EV1 either in the first, open state, when the actuating means MAC is to be placed in the disengaged state, or in the second, closed state, when the actuating means MAC is to be placed in the blocked state. As a result, in the disengaged state, the fluid flows between the first P1 and second P2 parts of the chamber CH, as well as between the first P1 and second P2 parts and the fluid reservoir RF. In the blocked state, the fluid is prevented from flowing not only between the first P1 and second P2 parts of the chamber CH, but also between the first P1 and second P2 parts and the fluid reservoir RF.

Figure 6:
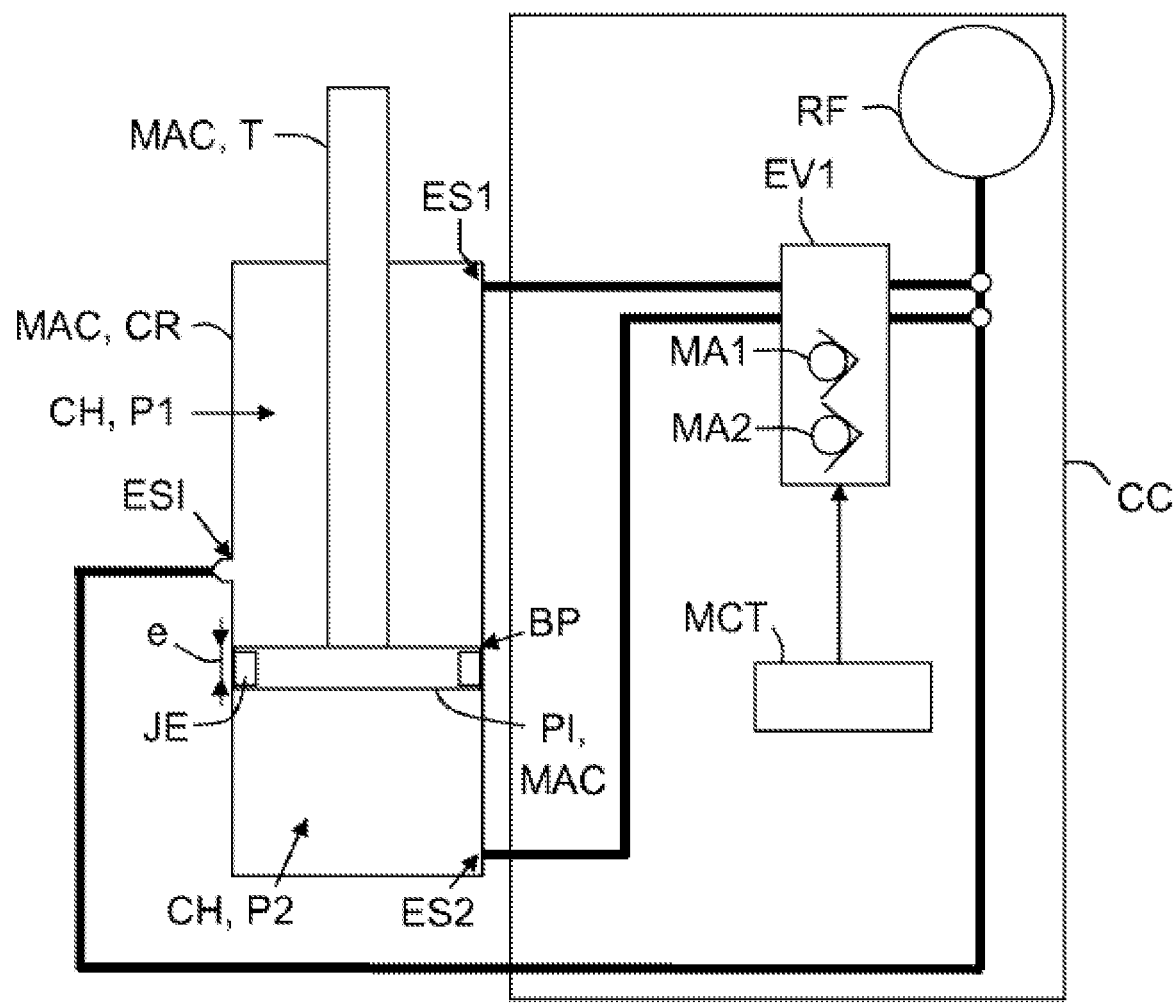

In the fourth form, illustrated in FIG. 6, the control circuit CC is a variant on that illustrated in FIG. 5. It comprises a four-way solenoid valve EV1 (k=1) (rather than three-way (hence the wording "at least three-way")) comprising the first MA1 and second MA2 non-return means, the fluid reservoir RF, and lines in which the fluid can flow. The mode of operation of this control circuit CC is identical to that described above in reference to FIG. 5, since only the internal arrangement of the solenoid valve EV1 is different.

Figure 7:
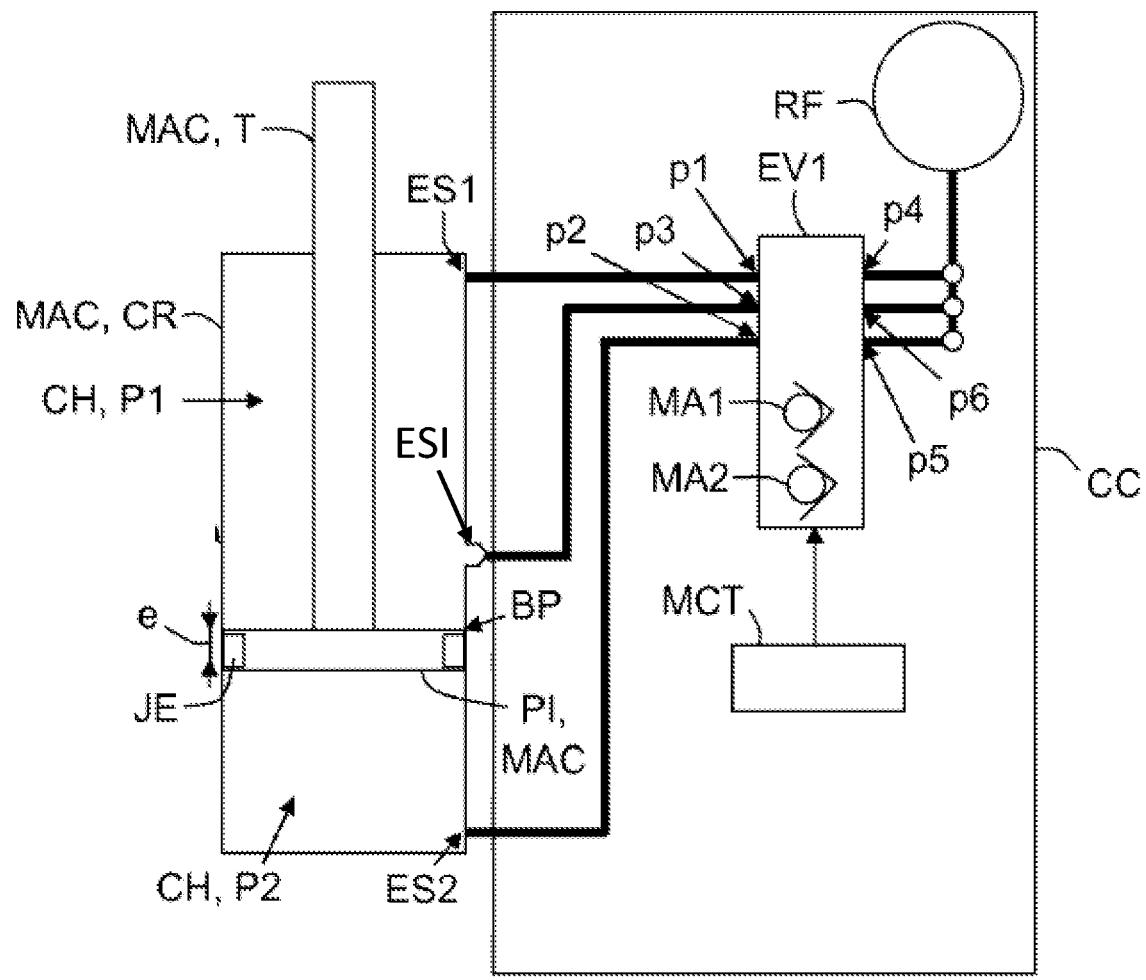

In the fifth form, illustrated in FIG. 7, the control circuit CC comprises a six-way (or six-port) solenoid valve EV1 (k=1) having ports p1 to p6 and comprising the first MA1 and second MA2 non-return means, the fluid reservoir RF, and lines in which the fluid can flow.

This control circuit CC couples the first ES1 and second ES2 inputs/outputs and the intermediate input/output ESI to the fluid reservoir RF via the solenoid valve EV1, which comprises the first MA1 and second MA2 non-return means, which only allow passage of fluid from the fluid reservoir to the first ES1 and second ES2 inputs/outputs respectively. The port p1 is coupled to the first input/output ES1 and thus to the first part P1 of the chamber CH. The port p2 is coupled to the second input/output ES2 and thus to the second part P2 of the chamber CH. The port p3 is coupled to the intermediate input/output ESI. The other ports p4 to p6 are coupled to the fluid reservoir RF.

In this case, the solenoid valve EV1 is capable of adopting either a first, open state, which is associated with the disengaged state and in which the fluid flows between the first P1 and second P2 parts and the fluid reservoir RF but does not flow between the intermediate input/output ESI and the fluid reservoir RF, or a second state, which is associated with the blocked state and in which the fluid flows from the fluid reservoir RF to the first P1 and second P2 parts of the chamber CH via the first MA1 and second MA2 non-return means respectively and flows between the intermediate input/output ESI and the fluid reservoir RF.

In addition, the control circuit CC places the solenoid valve EV1 either in the first, open state, when the actuating means MAC are to be placed in the disengaged state, or in the second state, when the actuating means MAC are to be placed in the blocked state. As a result, in the disengaged state, the fluid flows between the ports p1 and p4 and between the ports p2 and p5, and thus between the first P1 and second P2 parts of the chamber CH and the fluid reservoir RF, but cannot flow between the ports p3 and p6, preventing it from flowing between the intermediate input/output ESI and the fluid reservoir RF.

In the blocked state, the fluid flows from the port p4 to the port p1 via the first non-return means MA1, from the port p5 to the port p2 via the second non-return means MA2, and freely (in both directions) between the ports p3 and p6, and thus the intermediate input/output ESI is directly coupled to the fluid reservoir RF.

In each of the arrangement examples described above, the actuating means MAC may be placed in the blocked state regardless of the position of the piston PI, and this is particularly advantageous. However, if this placement in the blocked state occurs at the moment when the piston PI is not obstructing the intermediate input/output ESI, the piston PI will automatically return to a midway equilibrium position in which it obstructs the intermediate input/output ESI. This is referred to as automatic centering.

It will also be noted that the fluid reservoir RF and/or the first MA1 and second MA2 non-return means and/or each solenoid valve EVk and/or the lines may be external to the casing CR that defines the chamber CH, as is shown in FIGS. 3 to 7, or else may be housed in an optional additional casing, in which the casing CR defining the chamber CH is also housed.

It will also be noted that when the motor vehicle comprises two wheelsets, each of them may be equipped with an anti-roll device DA according to the invention.

The invention has numerous advantages, including:
the possibility of placing the actuating means in the blocked state thereof regardless of the current position of the piston,
simplification of the installation of the anti-roll device and of the command generation algorithm, as a result of the use of a single solenoid valve (or two solenoid valves operating simultaneously and identically with the same command) for each wheelset, and thus a single electrical power supply and control harness.
a decrease in the number of sensors required and in the complexity of the algorithm controlling the blocked state,
a decrease in the risk of breakdown or malfunction when a single solenoid valve is used for each wheelset.

The invention claimed is:
1. An anti-roll device for a motor vehicle wheelset, said device comprising a bar adapted to be coupled to right and left wheels of said wheelset via two links, wherein, said anti-roll device comprises:
  i) actuating means forming part of said bar or of one of said links and comprising a casing defining a chamber subdivided into first and second parts of variable volumes by a piston, said chamber comprising first and second inputs/outputs communicating with said first and second parts respectively and an intermediate input/output communicating with said first part or said second part depending on the position of said piston in said chamber, and said actuating means being switchable between a disengaged state and a blocked state in any given position of said piston, and
  ii) a hydraulic control circuit, said hydraulic control circuit comprising:
    a) a fluid reservoir;
    b) first and second non-return means in communication with said fluid reservoir, said first and second non-return means each being coupled to at least one of said first and second inputs/outputs and to said intermediate input/output, wherein said first and second non-return means are adapted to prevent fluid flow from said at least one of said first and second inputs/outputs to said reservoir; and
    c) a first solenoid valve and a second solenoid valve;
  wherein said hydraulic control circuit is controlled to switch said actuating means between said disengaged and blocked states; wherein:
    i) said first input/output is coupled to said fluid reservoir (1) via said first non-return means to only allow passage of fluid from said fluid reservoir to said first input/output, and (2) via said first solenoid valve which is mounted in parallel with said first non-return means, said first solenoid valve being switchable between a first, open state associated with said disengaged state of said actuating means and a second, closed state associated with said blocked state of said actuating means, ii) said second input/output is coupled to said fluid reservoir (1) via said second non-return means to only allow passage of fluid from said fluid reservoir to said second input/output, and (2) via said second solenoid valve which is mounted in parallel with said second non-return means, said second solenoid valve being switchable between a first, open state associated with said disengaged state of said actuating means and a second, closed state associated with said blocked state of said actuating means, and iii) said intermediate input/output is coupled to said fluid reservoir, and, wherein, said control circuit is controlled to place said first and second solenoid valves either in said first, open state so as to place said actuating means in said disengaged state or in said second, closed state so as to place said actuating means in said blocked state.

2. The anti-roll device according to claim 1, wherein one of said links comprises said actuating means and forms a link of variable length guided by said control, and the other link is of a fixed length.

3. The anti-roll device according to claim 1, wherein said bar comprises first and second arms each comprising a first end coupled to one of said links and a second end coupled to said casing or to said piston of the actuating means.

4. The anti-roll device according to claim 3, wherein said casing and piston define a cylinder actuator or a screw actuator.

5. The anti-roll device according to claim 4, wherein the screw actuator is a ball screw actuator.

6. A motor vehicle comprising at least one wheelset comprising right and left wheels, wherein the motor vehicle further comprises the anti-roll device according to claim 1, said anti-roll device being coupled to said right and left wheels of the wheelset.

7. An anti-roll device for a motor vehicle wheelset, said device comprising a bar adapted to be coupled to right and left wheels of said wheelset via two links, wherein, said anti-roll device comprises:

i) actuating means forming part of said bar or of one of said links and comprising a casing defining a chamber subdivided into first and second parts of variable volumes by a piston, said chamber comprising first and second inputs/outputs communicating with said first and second parts respectively and an intermediate input/output communicating with said first part or said second part depending on the position of said piston in said chamber, and said actuating means being switchable between a disengaged state and a blocked state in any given position of said piston, and ii) a hydraulic control circuit, said hydraulic control circuit comprising:

a) a fluid reservoir;

b) first and second non-return means in communication with said fluid reservoir, said first and second non-return means each being coupled to at least one of said first and second inputs/outputs and to said intermediate input/output, wherein said first and second non-return means are adapted to prevent fluid flow from said at least one of said first and second inputs/outputs to said reservoir; and c) at least one solenoid valve coupled to at least one of said first and second inputs/outputs, to said intermediate input/output, and to at least one of the first and second non-return means, said at least one solenoid valve being switchable between a first state in which said actuating means is in said disengaged state and a second state in which said actuating means is in said blocked state, wherein said at least one solenoid valve comprises a six-way solenoid valve; wherein, said first and second inputs/outputs and said intermediate input/output are coupled to said fluid reservoir via said six-way solenoid valve, said six-way solenoid valve:

i) comprising said first and second non-return means, and ii) being adapted to be switched between (1) a first, open state, associated with said disengaged state of said actuating means in which said fluid flows between said first and second parts of said chamber and said fluid reservoir but does not flow between said intermediate input/output and said fluid reservoir and (2) a second state, associated with said blocked state of said actuating means in which said fluid flows from said fluid reservoir to said first and second parts of said chamber via said first and second non-return means respectively and flows between said intermediate input/output and said fluid reservoir, and, wherein said control circuit is controlled to place said solenoid valve either in said first, open state so as to place said actuating means in said disengaged state or in said second state so as to place said actuating means in said blocked state.

8. The anti-roll device according to claim 7, wherein one of said links comprises said actuating means and forms a link of variable length guided by said control, and the other link is of a fixed length.

9. The anti-roll device according to claim 7, wherein said bar comprises first and second arms each comprising a first end coupled to one of said links and a second end coupled to said casing or to said piston of the actuating means.

10. The anti-roll device according to claim 9, wherein said casing and piston define a cylinder actuator or a screw actuator.

11. The anti-roll device according to claim 10, wherein the screw actuator is a ball screw actuator.

12. A motor vehicle comprising at least one wheelset comprising right and left wheels, wherein the motor vehicle further comprises the anti-roll device according to claim 7, said anti-roll device being coupled to said right and left wheels of the wheelset.

* * * * *